United States Patent
Murata (10) Patent No.: US 9,664,120 B2
(45) Date of Patent: May 30, 2017

(54) INDUCTION CONTROL UNIT FOR INTERNAL COMBUSTION ENGINE INCLUDING VARIABLE VALVE MECHANISM

(75) Inventor: Shinichi Murata, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 13/026,387

(22) Filed: Feb. 14, 2011

(65) Prior Publication Data

US 2011/0197836 A1 Aug. 18, 2011

(30) Foreign Application Priority Data

Feb. 15, 2010 (JP) ................ P2010-030340

(51) Int. Cl.
*F01L 1/34* (2006.01)
*F02D 13/02* (2006.01)
(Continued)

(52) U.S. Cl.
CPC ............. *F02D 13/023* (2013.01); *F02D 9/02* (2013.01); *F02D 41/042* (2013.01);
(Continued)

(58) Field of Classification Search
CPC ......... F02N 2200/0807; F02N 11/0814; F02N 11/0818; F02D 13/023; F02D 41/04;
(Continued)

(56) References Cited

U.S. PATENT DOCUMENTS 5,332,056 A * 7/1994 Niibe ................. B60K 31/0008
  180/169
6,155,217 A * 12/2000 Shiraishi .................. F01L 9/04
  123/321

(Continued)

FOREIGN PATENT DOCUMENTS

EP 1 803 905 A2 7/2007
JP 2000-34913 A 2/2000

(Continued)

*Primary Examiner* — Mahmoud Gimie
*Assistant Examiner* — John Zaleskas
(74) *Attorney, Agent, or Firm* — Birch, Stewart, Kolasch & Birch, LLP (57) ABSTRACT

A controller puts an internal combustion engine in a first induction control state in which a lift amount of an inlet valve is equal to or smaller than a predetermined amount and an opening of a throttle valve is larger than a predetermined opening with respect to a predetermined running state. The controller puts the internal combustion engine in a second induction control state in which the lift amount of the inlet valve is larger than the predetermined amount and the opening of the throttle valve is equal to or smaller than the predetermined opening with respect to the predetermined running state. An automatic stopper automatically stops the internal combustion engine in when the lift amount of the inlet valve is equal to or smaller than the predetermined amount, when a stopping condition of the internal combustion engine is met under which a predetermined vehicle state is produced.

5 Claims, 5 Drawing Sheets

(51) Int. Cl.
  *F02D 41/04* (2006.01)
  *F02N 11/08* (2006.01)
  *F02N 19/00* (2010.01)
  *F02D 9/02* (2006.01)
  *F02D 41/00* (2006.01)

(52) U.S. Cl.
  CPC .......... *F02N 11/084* (2013.01); *F02N 19/004* (2013.01); *F02D 2009/024* (2013.01); *F02D 2041/002* (2013.01); *F02D 2250/41* (2013.01); *F02N 2200/0807* (2013.01); *Y02T 10/18* (2013.01); *Y02T 10/42* (2013.01); *Y02T 10/48* (2013.01)

(58) Field of Classification Search
  CPC .. F02D 41/08; F02D 41/083; F02D 2041/002; B60T 13/57; B60T 13/72; B60T 13/662
  USPC ......... 123/90.15, 90.16, 179.1, 179.3, 179.4, 123/179.16, 179.18, 198 DB, 198 F, 123/345–348, 481; 701/104, 105, 112, 701/113
  See application file for complete search history.

(56) References Cited

U.S. PATENT DOCUMENTS

| | | | |
|---|---|---|---|
| 6,397,814 B1 * | 6/2002 | Nagaishi et al. | 123/348 |
| 6,401,012 B1 * | 6/2002 | Aoki et al. | 701/1 |
| 6,439,175 B2 * | 8/2002 | Arai et al. | 123/90.11 |
| 6,502,543 B1 * | 1/2003 | Arai et al. | 123/348 |
| 6,540,644 B2 * | 4/2003 | Morimoto et al. | 477/102 |
| 6,621,175 B1 * | 9/2003 | Kuroda et al. | 290/40 D |
| 6,629,515 B1 * | 10/2003 | Yamamoto et al. | 123/179.4 |
| 7,051,704 B2 * | 5/2006 | Kawamura | 123/322 |
| 7,073,469 B2 * | 7/2006 | Nohara et al. | 123/90.16 |
| 7,438,042 B1 | 10/2008 | Kawada | |
| 2002/0074173 A1 * | 6/2002 | Morimoto et al. | 180/65.2 |
| 2002/0108592 A1 * | 8/2002 | Takemura et al. | 123/90.17 |
| 2003/0004635 A1 * | 1/2003 | Kamiya et al. | 701/112 |
| 2003/0197385 A1 * | 10/2003 | Onoyama et al. | 290/40 R |
| 2003/0230279 A1 * | 12/2003 | Burkhard et al. | 123/399 |
| 2005/0229880 A1 | 10/2005 | Hashizume | |
| 2006/0037578 A1 | 2/2006 | Nakamura | |
| 2006/0075990 A1 * | 4/2006 | Muto et al. | 123/399 |
| 2006/0090728 A1 * | 5/2006 | Arinaga et al. | 123/339.19 |
| 2006/0236970 A1 * | 10/2006 | Inada | B60R 25/042 123/179.4 |
| 2008/0201064 A1 * | 8/2008 | DiGonis | 701/110 |
| 2008/0255752 A1 | 10/2008 | Sugihara | |
| 2009/0071147 A1 * | 3/2009 | Wang et al. | 60/547.1 |
| 2009/0095244 A1 | 4/2009 | Leone et al. | |
| 2009/0099752 A1 * | 4/2009 | Ikoma et al. | 701/103 |
| 2010/0282216 A1 * | 11/2010 | Hisaminato et al. | 123/48 R |
| 2012/0116656 A1 * | 5/2012 | Martin | B60T 13/662 701/110 |

FOREIGN PATENT DOCUMENTS

| | | | | |
|---|---|---|---|---|
| JP | 2001-173477 A | | 6/2001 | |
| JP | 2002-89303 A | | 3/2002 | |
| JP | 2002-266670 A | | 9/2002 | |
| JP | 2003049673 A | * | 2/2003 | |
| JP | 2004084513 A | * | 3/2004 | ............ F02D 43/00 |
| JP | 2005163634 A | * | 6/2005 | |
| JP | 2007278111 A | * | 10/2007 | |
| JP | 2008-280996 A | | 11/2008 | |

\* cited by examiner

INDUCTION CONTROL UNIT FOR INTERNAL COMBUSTION ENGINE INCLUDING VARIABLE VALVE MECHANISM

BACKGROUND OF THE INVENTION

1. Field of the Invention

The present invention relates to a control technique for an internal combustion engine with a variable valve mechanism of an automatic stop-and-restart vehicle.

2. Description of the Related Art

There have been developed automatic stop-and-restart vehicles in which an engine (an internal combustion engine) is automatically stopped when the vehicle stops running so as to increase the fuel economy. With the automatic stop-and-restart vehicle, the engine is automatically stopped when a predetermined stop condition is met in which the vehicle speed is 0 with the engine running at idle state, for example. In addition, the engine is automatically restarted when a predetermined restart condition is met in which the application of brakes is released after the engine has been automatically stopped.

On the other hand, there have been developed engines with a variable valve mechanism in which a lift amount of an inlet valve of the engine is varied. In an engine with the variable valve mechanism described above, in order to ensure the startability, the setting of the engine can be changed to a setting in which the actual compression ratio becomes relatively high when the engine is started or to a setting in which the actual compression ratio becomes relatively low by suppressing the amount of intake air in association with a throttle valve when the engine is running at idle state.

However, when the engine is set so that the actual compression ratio becomes high in the way described above, although the startability is increased, the torque fluctuation becomes large. Therefore, there is caused a problem that vibrations and striking noise of the starter become large when the engine is stopped and restarted. In the automatic stop-and-restart vehicle, noise and the like are desirably suppressed to as low a level as possible so as not to be sensed by the occupants when the engine is automatically stopped and restarted.

Then, in an automatic stop-and-restart vehicle including an engine with a variable valve mechanism, there has been developed a technique to control the variable valve mechanism so as to suppress an actual compression ratio when the engine is automatically stopped or restarted (Patent Document 1).

In Patent Document 1 above, the actual compression ratio is reduced by increasing a lift amount of an inlet valve when the engine is automatically stopped or restarted so as to retard a valve closing timing thereof during a compression stroke.

However, even in the event that a throttle valve is set to be closed while the engine is automatically being stopped, a negative pressure between the throttle valve and the inlet valve varies with time. When the engine is restarted in that state, since the lift amount is being set on the increased side, the amount of intake air is affected largely by a negative pressure working then, and the revolving speed and torque of the engine have not yet been stabilized, there being caused a fear that the occupants feel a sensation of physical disorder.

[Patent Document 1] Japanese Patent Publication Number 2000-34913

SUMMARY OF THE INVENTION

According to an advantageous aspect of the invention, there is provided a control unit for an internal combustion engine which enables stable automatic stop and restart of the engine by suppressing a variation in actual intake air amount when the engine is automatically stopped and restarted.

According to the invention, there is provided a control unit for an internal combustion engine comprising:

a variable valve mechanism configured to vary a lift amount of an inlet valve;

a throttle valve provided upstream of the inlet valve and configured to vary an opening area of an induction passage;

an automatic stopper configured to automatically stop the internal combustion engine; and a controller, operable to put the internal combustion engine in a first induction control state in which the lift amount of the inlet valve is equal to or smaller than a predetermined amount and the opening of the throttle valve is larger than a predetermined opening, with respect to a predetermined running state, and operable to put the internal combustion engine in a second induction control state in which the lift amount of the inlet valve is larger than the predetermined amount and the opening of the throttle valve is equal to or smaller than the predetermined opening, with respect to the predetermined running state, wherein the automatic stopper automatically stops the internal combustion engine in a case where the lift amount of the inlet valve is equal to or smaller than the predetermined amount, when a stopping condition of the internal combustion engine is met under which a predetermined vehicle state is produced.

The control unit may further comprise: a negative pressure detector configured to detect a negative pressure in a brake booster, and may be configured such that the automatic stopping of the internal combustion engine by the automatic stopper is prohibited until the negative pressure surpasses the first predetermined value in a case where a negative pressure detected by the negative pressure detector is equal to or smaller than a first predetermined pressure, when the stopping condition is met and the lift amount of the inlet valve is equal to or smaller than the predetermined amount.

The control unit may be configured such that: the controller puts the inlet valve and the throttle valve in the second induction control state, when the stopping condition is met, the lift amount of the inlet valve is equal to or smaller than the predetermined amount and the negative pressure detected by the negative pressure detector is equal to or smaller than the first predetermined pressure, and the controller puts the inlet valve and the throttle valve in the first induction control state when the detection value of the negative pressure detection means surpasses the first predetermined value.

The variable valve mechanism may be configured so that a valve closing timing of the inlet valve is advanced further than an induction bottom dead center in the first induction control state and is advanced further than a valve closing timing in the second induction control state.

The controller may restart the internal combustion engine when the detection value of the negative pressure detector surpasses a second predetermined pressure.

The second predetermined pressure may be a negative pressure lower than the first predetermined pressure.

According to the invention, there is provided a control unit for an internal combustion engine, comprising:

a variable valve mechanism configured to vary a lift amount of an inlet valve;

a throttle valve provided upstream of the inlet valve and configured to vary an opening area of an induction passage;

an automatic stopper configured to automatically stop the internal combustion engine; and a controller operable to put the internal combustion engine in a first induction control state in which the lift amount of the inlet valve is equal to or smaller than a predetermined amount or a second induction control state in which the lift amount of the inlet valve is larger than the predetermined amount, with respect to idling state, wherein the automatic stopper automatically stops the internal combustion engine in the first induction control state, when the stopping condition including the idling state is met.

DETAILED DESCRIPTION OF THE INVENTION

An embodiment of the invention will be described by reference to the drawings.

Figure 1:
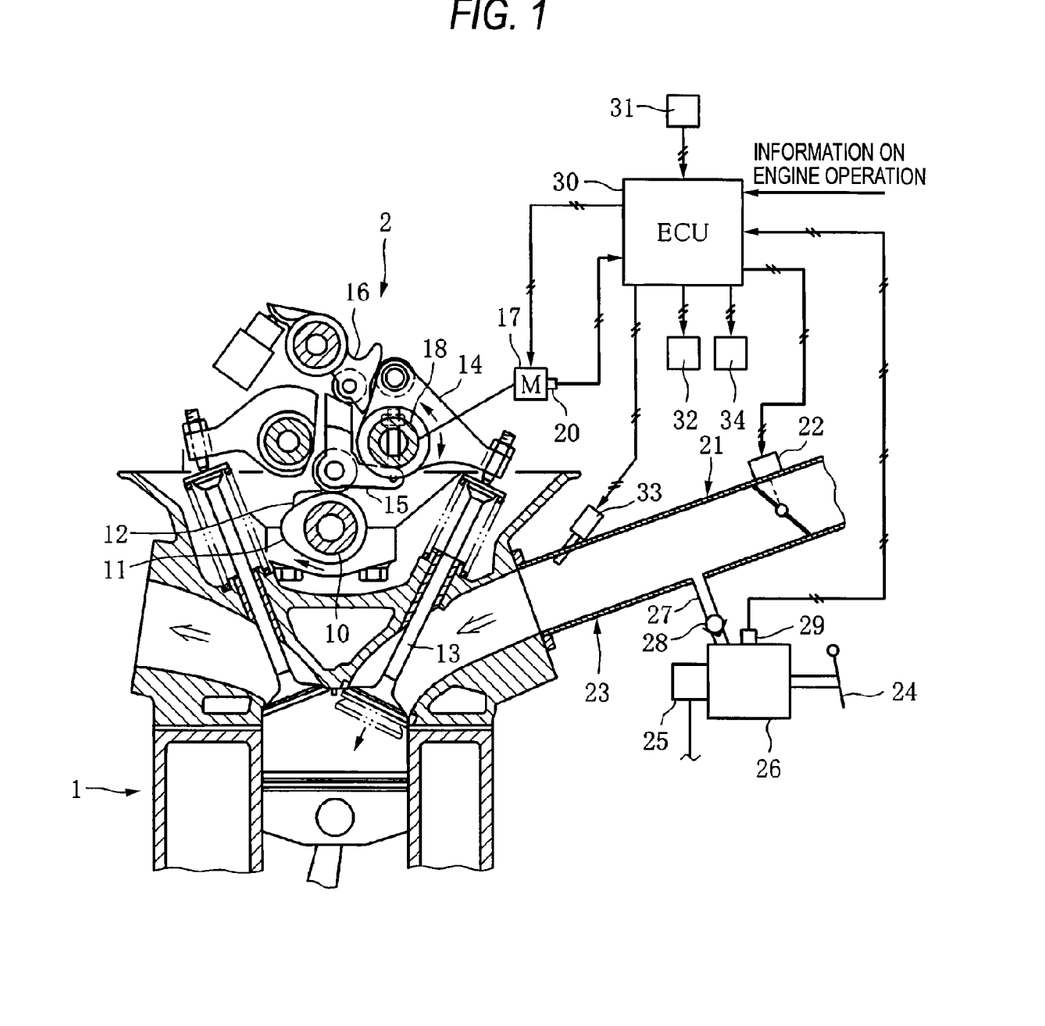
FIG. 1 is a schematic block diagram of an engine control system according to the invention.

FIG. 1 is a schematic block diagram of an engine control system of an automatic stop-and-restart vehicle according to the invention.

The automatic stop-and-restart vehicle of the embodiment includes a variable valve lift mechanism 2 (a variable valve mechanism) in an engine 1.

As is shown in FIG. 1, the engine 1 is a so-called SOHC engine in which inlet cams 11 and exhaust cams 12 are provided on a single camshaft 10. The construction of the variable valve lift mechanism 2 is described in JP-A-2005-299536, for example, and although the detailed description of the construction is omitted, the variable valve lift mechanism 2 includes center rocker arms 15 and swing rocker arms 16 in addition to the camshaft 10 and rocker arms 14 for driving inlet valves 13. Then, when the rocker arm 14 moves vertically as the inlet cam 11 rotates, a rocker shaft 18 is driven to rotate by a motor 17 so as to shift a fulcrum position of the center rocker arm 14, whereby a valve closing timing of the inlet valve 13 can be advanced unconditionally in conjunction with a reduction in lift amount with a valve opening timing maintained substantially constant from a maximum lift amount to a minimum lift amount of the inlet valve 13 while varying the maximum lift amount.

In addition, a rotation angle sensor 20 is provided on the motor 17 for detecting a rotation angle thereof.

A throttle valve 22 is provided in an induction passage 21 of the engine 1 for controlling the flow rate of intake air. The throttle valve 22 is disposed upstream of an induction manifold 23 and is controlled by an ECU 30 based on an opening of an accelerator pedal.

In addition, a brake booster 26 is provided on the vehicle which boosts a pedal effort exerted on a brake pedal 24 to activate a brake cylinder 25. The brake booster 26 is connected with the induction manifold 23 via a negative pressure passage 27. A check valve 28 is interposed along the negative pressure passage 27 for preventing a reverse flow from the induction passage 21 to the brake booster 26. The brake booster 26 produces a negative pressure in an interior thereof by making use of a negative pressure present in the induction passage 21 via the negative pressure passage 27 when the engine is activated. A negative pressure sensor 29 (a negative pressure detector) is provided in the brake booster 26 for detecting a negative pressure produced in the interior thereof.

The ECU 30 includes an input/output unit, a storage unit, and a central processing unit (CPU) and controls the engine in whole including the throttle valve 22. Operating information of an ignition key switch 31, a rotation angle of the motor 17, and information on various engine running conditions such as an idle switch, a brake switch, vehicle speed and engine speed are inputted into the ECU 30, and the ECU 30 controls the operation of the motor 17 as a variable valve lift mechanism controlling function. In addition, the ECU 30 controls the operations of a starter motor 32, a fuel injection valve 33 and an igniter 34 as an automatic start/restart control function. The storage unit is a ROM, RAM or non-volatile RAM.

Specifically, the ECU 30 causes the engine 1 to automatically stop by stopping the fuel injection from the fuel injection valve 33 as the automatic stop/restart control function (an automatic stop unit) when, for example, the ignition key switch 31 and the brake switch are on, the vehicle speed is equal to or slower than a predetermined vehicle speed, the engine speed is equal to or slower than a predetermined speed and the engine is running at idle state. In addition, the ECU 30 activates the starter motor 32 and the igniter 34 so as to restart the engine 1 when a predetermined restart condition is met, that is, the brake switch becomes off as a result of the application of brakes being released while the engine is being automatically stopped (during "idle stop").

Figure 2:
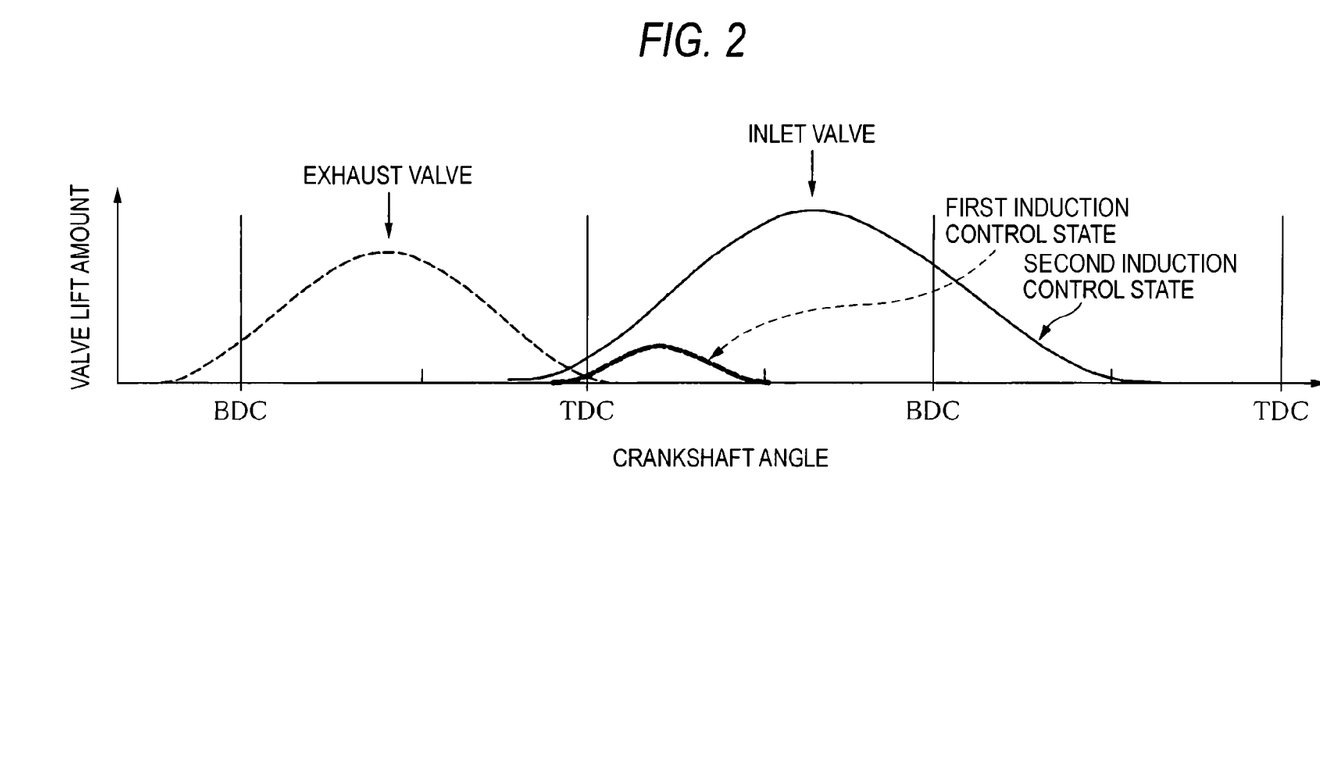
FIG. 2 is a graph showing valve timings of an engine according to an embodiment of the invention.

FIG. 2 is a graph showing valve timings of the engine 1 of the embodiment. Specifically, FIG. 2 shows transitions of lift amounts of the inlet valve 13 and an exhaust valve.

As is shown in FIG. 2, in the engine 1 including the variable valve lift mechanism 2, the valve timing of the inlet valve 13 can be set so as to vary continuously from a first induction control state in which a valve closing timing of the inlet valve 13 advances further than its bottom dead center (BDC) so as to constitute a minimum lift amount to a second induction control state in which the valve closing timing of the inlet valve 13 retards further than its BDC so as to constitute a maximum lift amount. The valve timing of the inlet valve 13 is determined by setting the lift amount and the valve closing timing.

In the first induction control state, an actual compression ratio becomes smallest. In the second induction control state, although the actual compression ratio is reduced further than a state in which the valve closing timing of the inlet valve 13 stays in proximity to its BDC, the actual compression ratio becomes higher than that of the first induction control state by the increase in lift amount.

Further, in this embodiment, the ECU 30 not only controls the variable valve lift mechanism 2 in the way described above but also controls the opening of the throttle valve 22. The ECU 30 controls the throttle valve 22 to increase the opening in the first induction control state, whereas in the second induction control state, the ECU 30 controls the throttle valve 22 to reduce the opening. By doing so, the engine 1 is allowed to run at idle state with either of the lift amounts.

In addition, the ECU 30 determines whether or not the engine 1 be automatically stopped in relation to a negative pressure present within the brake booster 26 in the automatic stop/restart control function. Hereinafter, using FIGS. 3 and 4, this will be described in detail.

Figure 3:
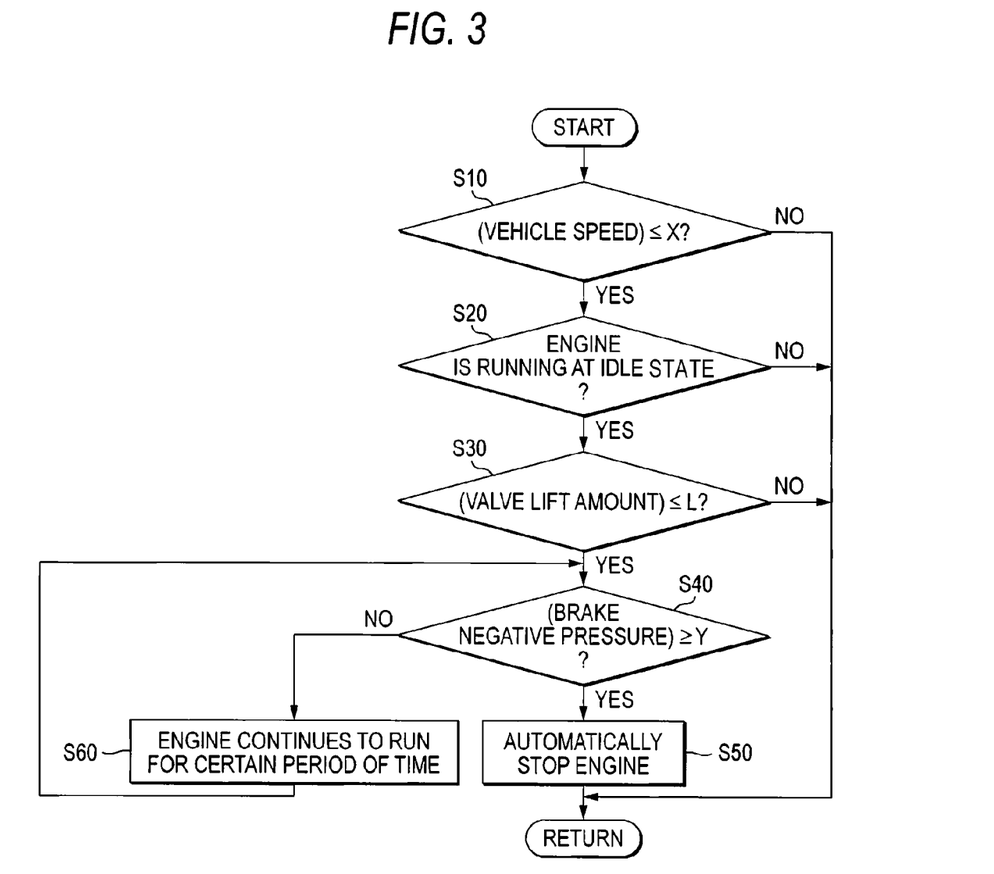
FIG. 3 is a flowchart showing a control procedure according to the invention to determine whether to implement an automatic stop with an engine in which a sufficient brake negative pressure is obtained in a first induction control state.
Figure 4:
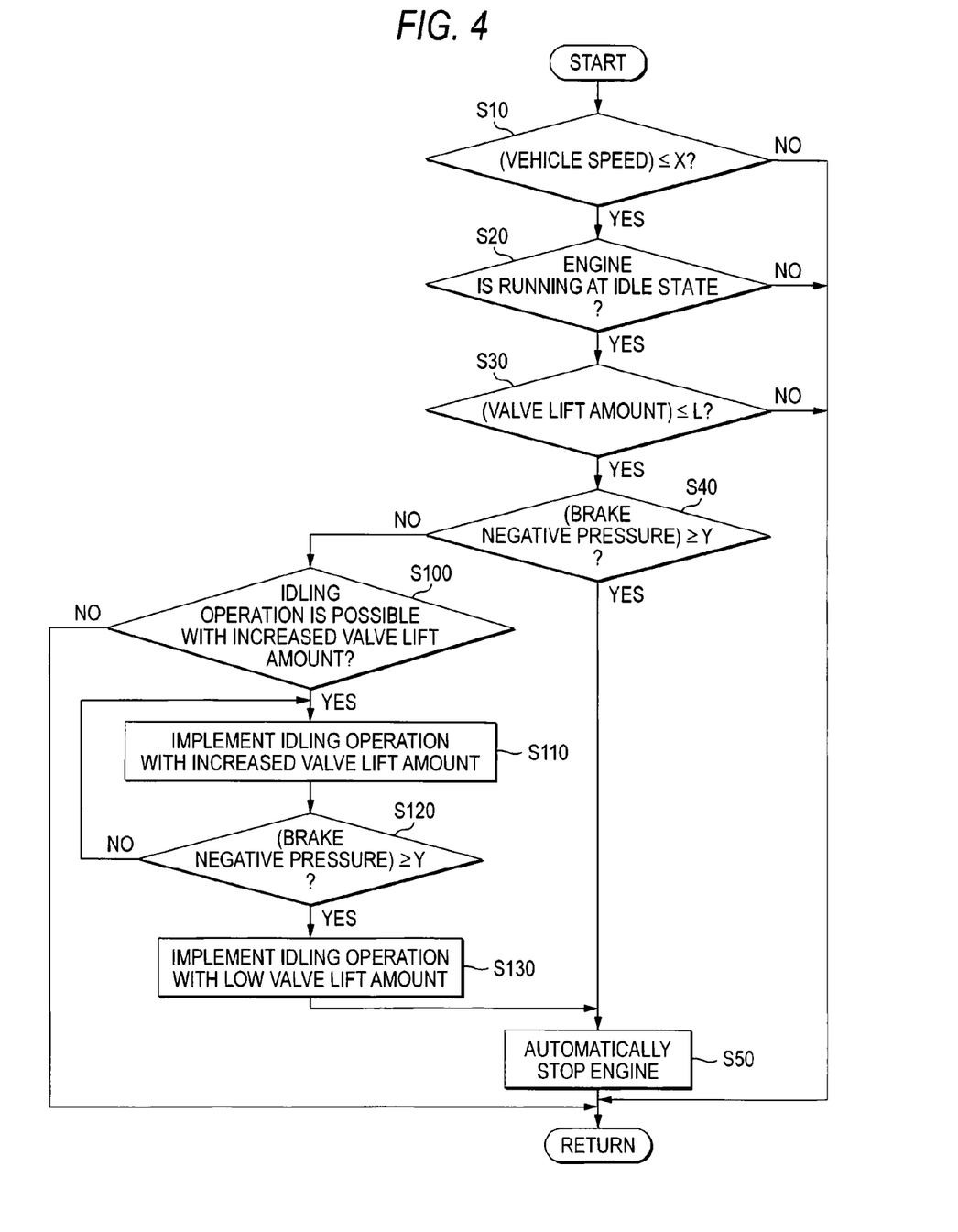
FIG. 4 is a flowchart showing a control procedure according to the invention to determine whether to implement an automatic stop with an engine in which a sufficient brake negative pressure is not obtained.

Different controls will be implemented depending upon the properties of the engine 1 when determining whether to implement the automatic engine stop. Specifically, with an engine in which the negative pressure (the brake negative pressure) within the brake booster 26 can be obtained so largely that a sufficient braking performance can be ensured with a predetermined pedal effort when the valve timing by the variable valve lift mechanism 2 is set or the lift amount of the inlet valve 13 is set to the first induction control state, a determination procedure shown in FIG. 3 is implemented to determine whether to implement the automatic engine stop. With an engine in which a brake negative pressure cannot be obtained which is so large that a sufficient braking performance can be ensured with the predetermined pedal effort, a determination procedure shown in FIG. 4 is implemented to determine whether to implement the automatic engine stop.

FIG. 3 is a flowchart showing a control procedure to determine whether to implement the automatic engine stop with an engine in which a sufficient brake negative pressure is obtained in the first induction control state.

The ECU 30 performs repeatedly a routine shown in FIG. 3 when the ignition key switch is on.

Firstly, in step S10, the ECU 30 determines whether or not the vehicle speed is equal to or slower than a predetermined value X based on information on the running conditions of the vehicle. This predetermined value X is one of the automatic stopping conditions by the automatic stop/restart control function and may be set as required. If the vehicle speed is equal to or slower than the predetermined value X, the routine proceeds to step S20.

In step S20, the ECU 30 determines whether or not the engine 1 is running at idle state. Whether or not the engine 1 is running at idle state can be determined from information in the ECU 30 on the control of the engine 1. If the engine 1 is determined to be running at idle state, the routine proceeds to step S30.

In step S30, a rotation angle of the motor 17 is inputted into the ECU 30 from the rotation angle sensor 20, and the ECU 30 determines whether or not the lift amount of the inlet valve 13 which is currently set in the variable valve lift mechanism 2 is equal to or smaller than a predetermined amount L. This predetermined amount L may be set so as to determine whether or not the lift amount of the inlet valve 13 stays in proximity to the first induction control state in which the lift amount becomes smallest. If the lift amount is equal to or smaller than the predetermined amount L, the routine proceeds to step S40.

In step S40, a brake negative pressure is detected by the negative pressure sensor 29 to see whether or not the detected braking negative pressure is equal to or larger than a predetermined pressure Y (a first predetermined pressure). The predetermined pressure Y may be set to a value with which a sufficient braking performance can be obtained with the predetermined pedal effort. If the brake negative pressure is determined to be equal to or larger than the predetermined pressure Y, the routine proceeds to step S50.

In step S50, the automatic engine stop control in the automatic stop/restart control function is implemented. Specifically, the engine 1 is stopped by stopping the injection of fuel from the fuel injection valve 33. Then, the routine is returned.

In step S40, if the brake negative pressure is determined to be less than the predetermined pressure Y, the routine proceeds to step S60.

In step S60, the control unit 30 causes the engine 1 to run for a certain period of time so that the brake negative pressure becomes equal to or larger than the predetermined pressure Y. Then, the routine returns to step S40.

In addition, if the vehicle speed is determined to be faster than the predetermined value X in step S10, if the engine is determined not to be running at idle state in step S20, or the valve lift amount is determined not to be set to the predetermined amount L in step S30, the routine is returned.

In the embodiment configured as has been described heretofore, since the actual compression ratio is reduced by reducing the lift amount of the inlet valve 13 when the engine 1 is automatically stopped and restarted, the variation in revolving speed and torque of the engine 1 is suppressed. In particular, since the actual compression ratio is reduced by reducing the lift amount and the engine is permitted to be automatically stopped in case the lift amount is equal to or smaller than the predetermined amount, the variation in pressure within the induction manifold 23 can be suppressed when the engine 1 is automatically stopped so as to suppress the variation in the amount of intake air. Consequently, the revolving speed and torque of the engine 1 is made stable in an ensured fashion, thereby making it possible to automatically stop and restart the engine in a stable fashion without causing the occupants to feel the sensation of physical disorder.

In addition, since the valve closing timing of the inlet valve 13 advances further than its induction bottom dead center in proximity to the first induction control state, the actual compression ratio is reduced further, and the pumping loss is reduced accordingly. Consequently, the fuel consumption reduction effect by the automatic engine stop can be increased.

Further, in this embodiment, the automatic engine stop is permitted only under such conditions that the lift amount of the inlet valve 13 is set to be so low that the lift amount of the inlet valve 13 is equal to or smaller than the predetermined value L and the brake negative pressure is equal to or larger than the predetermined pressure Y when such automatic engine stopping conditions are met that the vehicle speed is equal to or slower than the predetermined value X and the engine 1 is running at idle state. Consequently, when the engine 1 is automatically stopped, the brake negative pressure becomes equal to or larger than the predetermined pressure Y at all times. By this configuration, a stable operation of the brakes can be attained when the engine 1 is automatically stopped, thereby making it possible to keep the vehicle parked in an ensured fashion.

Since the automatic engine stop is prohibited by the automatic stopper until the negative pressure present in the brake booster surpasses the predetermined pressure, in case the negative pressure within the brake booster is reduced as a result of the lift amount being reduced when the engine 1 is automatically stopped, the automatic engine stop is not implemented, thereby making it possible to avoid the occurrence of insufficient braking force while the engine 1 is being automatically stopped.

Further, if the brake negative pressure is less than the predetermined pressure Y, since the engine 1 is continuously run for a certain period of time even though the other automatic stopping conditions are met, the brake negative pressure is increased. Consequently, the restriction on automatic engine stop due to insufficient brake negative pressure is solved, so that the frequency of occurrence of automatic engine stop can be increased, thereby making it possible to increase the fuel consumption reduction effect.

If the negative pressure within the brake booster is equal to or larger than the predetermined pressure Y, as the second induction control state, since the lift amount of the inlet valve is increased to surpass the predetermined value and the opening of the throttle valve is made equal to or smaller than the predetermined opening, the negative pressure within the brake booster can be increased positively. Consequently, the prohibition of automatic engine stop can be cancelled quickly, whereby the frequency of occurrence of automatic engine stop can be increased, thereby making it possible to increase the fuel consumption reduction effect.

FIG. 4 is a flowchart showing a control procedure to determine whether to implement an automatic stop with an engine in which a sufficient brake negative pressure is not obtained.

The ECU 30 performs repeatedly a routine shown in FIG. 4 when the ignition key switch 31 is on.

Controls in steps S10 to S50 of this routine are the same as those of the routine shown in FIG. 3, and hence, the description thereof will be omitted here.

In step S40, if the brake negative pressure is determined to be less than the predetermined pressure Y, the routine proceeds to step S100.

In step S100, the ECU 30 determines whether or not the engine 1 can run at idle state with an increased lift amount of the inlet valve 13 or during a valve lift amount increased engine operation. The ECU 30 determines whether or not the engine 1 can run at idle state in such a state that the lift amount of the inlet valve 13 is increased to the second induction control state and the opening of the throttle valve 22 is reduced correspondingly. If the engine 1 is determined to run at idle state, the routine proceeds to step S110.

In step S110, the valve lift amount increased engine operation is implemented with the lift amount of the inlet valve 13 increased to the second induction control state and the opening of the throttle valve 22 reduced. The routine proceeds to step S120.

In step S120, a brake negative pressure is detected by the negative pressure sensor 29, and the ECU 30 determines whether or not the detected negative pressure is equal to or larger than the predetermined pressure Y. If the detected brake pressure is determined to be equal to or larger than the predetermined pressure Y, the routine proceeds to step S130.

In step S130, the lift amount of the inlet valve 13 is set to the first induction control state, and the engine 1 is run at idle state with a low valve lift. Then, the routine proceeds to step S50.

In addition, if the vehicle speed is determined to be faster than the predetermined value X in step S10, if the engine 1 is determined to be running at idle state in step S20, the valve lift amount of the inlet valve 13 is determined not to be set to the first induction control state in step S30, or if it is determined that the engine 1 cannot run at idle state during the valve lift amount increasing operation in step S100, the routine is returned.

Thus, by the variable valve lift mechanism 2 being controlled by the ECU 30 in the way described above, in this embodiment, in case the brake negative pressure is less than the predetermined pressure Y, if possible, the valve lift amount increased engine operation is implemented or the engine 1 is run with an increased lift amount of the inlet valve 13, so as to increase the brake negative pressure positively. Consequently, by enabling the automatic engine stop by increasing the brake negative pressure to become equal to or larger than the predetermined pressure Y quickly, a long period of time is ensured for the automatic engine stop, thereby making it possible to increase the fuel consumption reduction effect.

Figure 5:
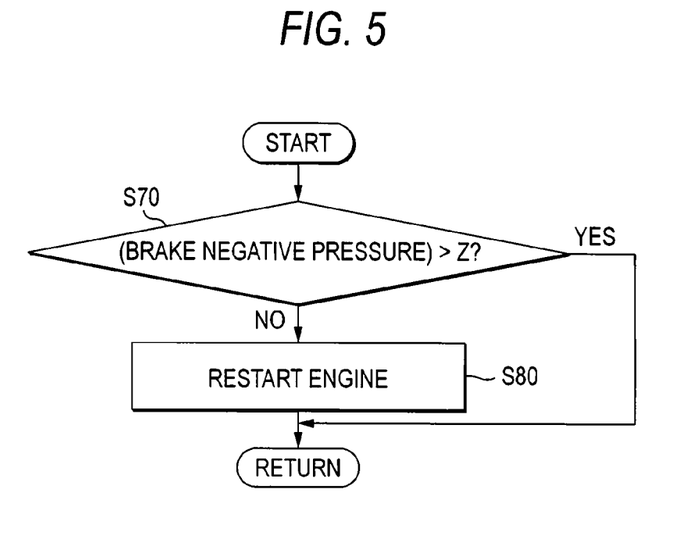
FIG. 5 is a flowchart showing a control procedure according to the invention to determine whether to implement a restart according to a detected brake negative pressure value while the engine is being automatically stopped.

FIG. 5 is a flowchart showing a control procedure to determine whether to implement a restart according to a detected brake negative pressure value while the engine is being automatically stopped. In step S70, if the brake negative pressure is determined to be changed to be less than a smaller negative pressure than a predetermined pressure Z (a second predetermined pressure) due to the operation of the brake pedal by the driver or a leakage of pressure, the routine proceeds to step S80.

In step S80, a restart control in the automatic stop/restart control function is implemented. Specifically, cranking is implemented to activate the engine 1. Then, the routine is returned.

Here, although the predetermined pressure Z in step S70 may be the same value as that of the previous predetermined pressure Y, by setting the former to be a smaller negative pressure than the predetermined pressure Y, the number of times of implementing unnecessary restarts or stops can be reduced, thereby making it possible to increase the fuel consumption reduction effect. In addition, this serves not only to increase the durability of components in relation to starting the engine 1 but also to reduce the sensation of physical disorder that is to be felt by the driver.

When the negative pressure within the brake booster becomes smaller than the predetermined pressure when the internal combustion engine is automatically stopped, by restarting the internal combustion engine, the negative pressure within the brake booster can be increased positively even in the event that the negative pressure becomes insufficient due to the brakes being applied by the driver, for example. Consequently, since the braking performance can be maintained, the safety is ensured.

In addition, the engine can be set so as not to be restarted when the parking brake is applied.

While the preferred embodiment of the invention has been described heretofore, the invention is not limited to the specific embodiment, and hence, the invention can be modified or altered variously without departing from the spirit and scope of the invention unless otherwise specifically limited in the above description.

In the embodiment that has been described heretofore, while the lift amount of the inlet valve 13 is described as being determined whether or not it exists in proximity to the first induction control state, this is because the lift amount of the inlet valve may varies slightly when the engine is running at idle state depending upon driving environment such as atmospheric pressure since the lift amount at idle is not set to a constant value but is adjusted minutely in consideration of combustion stability. In this way, by the predetermined value L which is the threshold not being set to the smallest value but being allowed to range therearound, the frequency of occurrence of automatic engine stop can be increased while the stable idling operation of the engine is maintained, thereby making it possible to realize a further increase in fuel economy. In addition, in this embodiment, while the lift amount is obtained by the rotation angle sensor 20, the lift amount may be obtained from a control value of the motor 17. Further, it is good to determine the lift amount in considering generally induction manifold pressure and throttle valve opening. By doing so, even when the lift amount is adjusted minutely when the engine is running at idle state, a lift amount can be estimated at a point in time when a control value of the motor 17 is obtained before it is adjusted minutely, whereby the determination in step S30 can be made quickly so as to advance the timing at which the automatic engine stop is permitted, thereby making it possible to ensure a longer period of time for automatic engine stop.

What is claimed is:

1. A control unit for an internal combustion engine, comprising:
   a variable valve mechanism configured to vary a lift amount of an inlet valve;
   a throttle valve provided upstream of the inlet valve and configured to vary an opening area of an induction passage;
   a negative pressure detector configured to detect a negative pressure in a brake booster, and
   a processor and a storage unit that stores a program that causes the processor to:
      determine, as a vehicle running condition determining unit, that a vehicle is in a stopped state when an actual vehicle speed detected by a speed sensor is equal to or lower than a predetermined value;
      automatically stop, as an automatic stop unit, the internal combustion engine by an operation of a fuel injection valve; and
      perform, as a controller,
         to put the internal combustion engine in a first induction control state in which the lift amount of the inlet valve is equal to or smaller than a predetermined amount and the opening of the throttle valve is larger than a predetermined opening, with respect to a predetermined running state,
         to put the internal combustion engine in a second induction control state in which the lift amount of the inlet valve is larger than the predetermined amount and the opening of the throttle valve is equal to or smaller than the predetermined opening, with respect to the predetermined running state, and
         to determine whether the internal combustion engine is operable in an idle state in the second induction control state; and
         to determine, as an engine idle state determining unit, whether the engine is running at the idle state,
   wherein the controller:
   a) controls the automatic stop unit to automatically stop the internal combustion engine in a case where the lift amount of the inlet valve is equal to or smaller than the predetermined amount, when a stopping condition of the internal combustion engine, under which a predetermined vehicle state including the idle state of the internal combustion engine is produced and the stopped state of the vehicle is satisfied, is met;
   b) prohibits the automatic stopping of the internal combustion engine by the automatic stop unit until the detected negative pressure surpasses a first predetermined pressure, indicative of a predetermined negative pressure required for obtaining sufficient operation of a brake, in a case where the detected negative pressure is smaller than the first predetermined pressure, at a time when the stopping condition is met and the lift amount of the inlet valve is equal to or smaller than the predetermined amount,
   c) puts the inlet valve and the throttle valve in the second induction control state when all of predetermined conditions are satisfied, wherein the predetermined conditions include that the vehicle is in the stopped state, that the engine is in the idle state, that the lift amount of the inlet valve is equal to or smaller than the predetermined amount, and that the negative pressure is lower than the first predetermined pressure, and the internal combustion engine is determined to be operable in the idle state in the second induction control state,
   d) determines, after the inlet valve and the throttle valve are put in the second induction state in step c), whether the detected negative pressure becomes equal to or higher than the first predetermined pressure, and
   e) controls the automatic stop unit to automatically stop the internal combustion engine after putting the inlet valve and the throttle valve in the first induction control state, when the negative pressure detected in step d) becomes equal to or higher than the first predetermined pressure.

2. The control unit for an internal combustion engine as set forth in claim 1, wherein
   the variable valve mechanism is configured so that a valve closing timing of the inlet valve is advanced further than an induction bottom dead center in the first induction control state and is advanced further than a valve closing timing in the second induction control state.

3. The control unit for an internal combustion engine as set forth in claim 2, wherein
   the controller restarts the internal combustion engine when a detection value of the negative pressure detector surpasses a second predetermined pressure.

4. The control unit for an internal combustion engine as set forth in claim 3, wherein
   the second predetermined pressure is a negative pressure lower than the first predetermined pressure.

5. A control unit for an internal combustion engine, comprising:
   a variable valve mechanism configured to vary a lift amount of an inlet valve;
   a throttle valve provided upstream of the inlet valve and configured to vary an opening area of an induction passage; and
   a processor and a storage unit that stores a program that causes the processor to:
      determine, as a vehicle running condition determining unit, that a vehicle is in a stopped state when an actual vehicle speed detected by a speed sensor is equal to or lower than a predetermined value;
      automatically stop, as an automatic stop unit, the internal combustion engine by an operation of a fuel injection valve;
      determine as an engine idle state determining unit, whether the internal combustion engine is running at an idle state;
      determine, as an idle operation determining unit, whether the internal combustion engine is operable in the idle state in a second induction control state, in which the lift amount of the inlet valve is larger than a predetermined value, when (a) the vehicle is in the stopped state, (b) the internal combustion engine is in the idle state, (c) the lift amount of the inlet valve is equal to or smaller than the predetermined amount, and (d) a negative pressure in a brake booster is lower than a predetermined pressure; and control, as a controller, to:

A) put the internal combustion engine in a first induction control state in which the lift amount of the inlet valve is equal to or smaller than the predetermined amount or the second induction control state, with respect to the idle state, B) put the internal combustion engine in the second induction control state at a time when the conditions (a)-(c) are met, and the idle operation determining unit determines that the internal combustion engine is operable in the idle state in the second induction control state, C) determine, after the internal combustion engine is put in the second induction control state in step B), whether the detected negative pressure becomes equal to or higher than the predetermined pressure, and D) control the automatic stop unit to automatically stop the internal combustion engine in the first induction control state when the negative pressure detected in step C) becomes equal to or higher than the predetermined pressure.

* * * * *